3,519,717
NOVEL METHOD FOR LOWERING HIGH BLOOD PRESSURE AND COMPOSITIONS THEREFOR
Samson Symchowicz, Livingston, and Margaret H. Sherlock, Bloomfield, N.J., assignors to Schering Corporation, Bloomfield, N.J., a corporation of New Jersey
No Drawing. Continuation-in-part of application Ser. No. 448,846, Apr. 16, 1965. This application Jan. 17, 1968, Ser. No. 698,385
Int. Cl. A61k 27/00
U.S. Cl. 424—266    14 Claims

ABSTRACT OF THE DISCLOSURE

This invention relates to compositions of matter useful as anti-hypertensive agents and to the method of lowering high blood pressure in warm-blooded animals. The active hypotensive agents are substituted picolinic acids and ester and amide derivatives of said acids.

---

This application is a continuation-in-part application of our earlier filed application, Ser. No. 448,846, filed on April 16, 1965, now abandoned.

It is an object of this invention to provide novel pharmaceutical compositions which have the effect of lowering high blood pressure in warm-blooded animals. It is another object of this invention to provide a novel method for lowering high blood pressure in warm-blooded animals. Other objects will become apparent to those skilled in the art in the light of the instant specification.

It has been found that the objects of this invention may be realized by providing a pharmaceutical composition comprising, as an essential active hypotensive ingredient thereof, a pharmaceutically effective amount of a compound having the general structural formula:

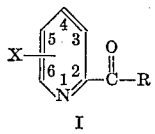

I wherein X represents a member of the group consisting of lower alkyl, lower alkenyl, lower alkoxy, phenyl and $X_1$ substituted phenyl wherein $X_1$ is a member of the group consisting of lower alkoxy, halogen, trifluoromethyl and hydroxy, X being located at the 3-, 4- or 5-positions, R represents a member of the group consisting of —OH, —O-lower alkyl, and —$NR_1R_2$ wherein $R_1$ is a member of the group consisting of hydrogen, methyl and ethyl, and $R_2$ is a member of the group consisting of hydrogen, methyl, ethyl and, when $R_1$ is hydrogen, $R_2$ is also hydroxy and cyclopropyl.

As used herein, the X-substituent terms "lower alkyl" and "lower alkoxy" include the straight, cyclized and branched chain radicals having from 1 to 8 carbon atoms and, for purposes of illustration, embrace such radicals as methyl, ethyl, n-butyl, isopropyl, cyclopropyl, cyclohexyl, cyclohexylmethyl, cyclopentyl, methoxy, ethoxy, propoxy, cyclopropoxy, n-butoxy, and the like. The term "lower alkenyl" is limited to those straight and cyclized unsaturated radicals having 3 to 6 carbon atoms and, for purposes of illustration, embrace such radicals as allyl, butenyl, cyclopentenyl and the like. The preferred esters of Formula I, i.e., when R represents O-lower alkyl, are methyl and ethyl and such other esters derived from alcohols having up to six carbon atoms. The preferred halogen substituents are chloro and bromo.

The X-substituted picolinic acids and the esters and amides of Formula I are compounds which are well known or may be readily prepared by methods analogous to those fully described in the art. For example, to prepare 5-n-butyl-picolinamide, mix 25 g. of 5-n-butylpicolinic acid and 25 ml. of thionyl chloride; after all of the acid is dissolved, concentrate (in vacuo) the mixture and take up the mixture in 500 ml. of anhydrous benzene; with cooling add the mixture to a solution of excess ammonia in one liter of benzene, concentrate (in vacuo) the resulting mixture; add water and potassium carbonate and extract the amide with ether; dry and concentrate the ether extract and recrystallize the residual solid from acetonitrile. Similarly, other X-substituted picolinamides and picolinic acid esters may be prepared by standard amidation and esterification procedures too well known in the art to merit further discussion.

The hypotensive agents of this invention, as defined by Formula I, can be administered as such, or can be administered in the form of a composition comprising the active ingredient and any of the commonly used pharmaceutical carriers. These carriers must be compatible with the active ingredient, and can be either solid or liquid, therapeutically active or insert. By using such carriers, one can make these compositions in the form of tablets, capsules, powders, oral suspensions, or syrups. The compositions can also be made in the form of sterile solutions which are suitable for injection. The compositions will contain from 1% to 95% by weight of active compound, and from 5% to 99% by weight of a suitable pharmaceutical carrier. These ranges, however, are not critical and can be varied as desired according to the circumstances.

A sterile solution suitable for injection is prepared by admixing from 0.5 to 5 parts by weight of the active ingredient, preferably in the form of its alkali metal salt, and from 95 to 99.5 parts by weight of water or isotonic saline solution at a temperature and for time sufficient to dissolve the active ingredient. This solution is then sterilized by filtration or by the application of heat. The solution is preferably sterilized in an autoclave at a steam pressure of 15 pounds per square inch for from 5 to 15 minutes. A preferred solution for injection also contains preservatives such as a mixture of methyl- and propylparaben benzoic acid, or other nontoxic antimicrobial agents.

These injectable solutions can be prepared with a high concentration of active ingredient. The solution is then diluted to a desired concentration before it is used.

The compounds of Formula I can also be administered in the form of hard or soft gelatin capsules. These capsules are filled with the proper amount of active ingredient and a solid filler, such as starch, gelatin, lactose, talc, stearic acid, or magnesium stearate. Such a capsule can contain from 50 to 250 milligrams of active material, thus providing a minimum dose of active ingredient in a form convenient for oral administration.

The compounds of Formula I, when mixed with a suitable carrier, can also be formulated as tablets. Such carriers must be compatible with the active ingredient and can be the carriers mentioned for use with capsules, or can be such binders or fillers as cornstarch, acacia, gelatin, or cellulosic materials. Generally, any of the tableting materials conventionally used in pharmaceutical practice can be employed if there is no incompatibility with the active ingredient.

The tablets are made by admixing the active ingredient, a suitable filler, a lubricant or mold-release agent, and a binder, and compressing the mixture in a conventional tableting machine into tablets of a preselected size. Preferably, each tablet will contain from 50 to 250 milligrams of active ingredient. The tablets can be scored so that they are easily broken. Optionally, the tablets can be coated with tablet-coating materials in order to make them more attractive and palatable. They can also have enteric coatings so that they will release their ingredients slowly and over a longer period.

The compounds of Formula I can also be formulated and administered as suspensions or syrups. The antihypertensive compound is usually present in such suspensions and syrups in amounts of from 1% to 5% by weight, however, lower or higher concentrations can be used.

The pharmaceutical carrier in such suspensions or syrups can be an aqueous vehicle such as an aromatic water, a syrup, or a pharmaceutical mucilage. Suitable aromatic waters include the following: Anise Water, N.F. (IX); Bitter Almond Water, N.F. (VIII); Camphor Water, N.F.; Cinnamon Water, U.S.P.; Fennel Water, N.F.; Peppermint Water, U.S.P.; Spearmint Water, N.F. (IX); Wintergreen Water, N.F. (IX). Suitable syrups include the following: Syrup (Simple Syrup), U.S.P.; Acacia Syrup, U.S.P.; Aromatic Eriodictyon Syrup, N.F.; Aromatic Rhubarb Syrup, N.F. (IX); Cacao Syrup, U.S.P.; Cherry Syrup, U.S.P.; Cinnamon Syrup, N.F. (IX); Citric Acid Syrup, U.S.P.; Compound Sarsparilla Syrup, N.F.; Compound White Pine Syrup, N.F.; Ginger Syrup, N.F. (IX); Glycyrrhiza (Licorice) Syrup, U.S.P.; Orange Syrup, U.S.P.; Orange Flower Syrup, N.F.; Raspberry Syrup, U.S.P.; Rhubarb Syrup, N.F. (IX); Tolu Balsam Syrup, U.S.P.; Wild Cherry Syrup, U.S.P. Suitable pharmaceutical mucilages include the following: Acacia (Gum Arabic), U.S.P.; Acacia Mucilage, U.S.P.; Tragacanth, U.S.P.; Tragacanth Mucilage, N.F. The pharmaceutical carrier in the suspensions or syrups can also be a hydroalcoholic vehicle, such as an elixir. Suitable elixirs include the following: Aromatic Elixir, U.S.P.; Red Aromatic Elixir, N.F.; Glycyrrhiza Elixir, N.F.; Iso-Alcoholic Elixir (Iso-Elixir), N.F. Coloring agents, tinctures, spirits and other adjuvants can be admixed witth the composition if desired.

Typical formulations incorporating the hypotensive agents of Formula I are described below. These formulations are intended to be illustrative merely and no limitation is implied or intended.

TABLET FORMULATION

Formula: Grams per 1000 tablets
5-n-butylpicolinamide _____ 200.0
Lactose _____ 90.0
Dicalcium phosphate, hydrous _____ 122.5
Polyvinylpyrrolidone _____ 25.0
Polyvinylglycol 1500 _____ 7.5
Corn starch _____ 50.0
Magnesium stearate _____ 5.0
                                                   ———
                                                   500.0

Mix the 5-n-butylpicolinamide, the lactose and the dicalcium phosphate. Dissolve the polyethylene glycol 1500 and the polyvinylpyrrolidone in approximately 20 ml. of water. Granulate the powder blend with the water solution, adding additional water if necessary, to produce a damp mass. Pass the wet granulation through a 12 mesh screen; spread on trays and air dry at 35° C. Blend the dry granules with the starch and the magnesium stearate. Compress into 500 mg. tablets.

CAPSULE FORMULATION

Formula: Grams per 1000 capsules
5-n-butylpicolinamide _____ 200.0
Lactose _____ 198.0
Magnesium stearate _____ 2.0
                                                   ———
                                                   400.0

Blend the ingredients and fill into hard gelatin capsules.

ELIXIR FORMULATION

Formula:
5-n-butyl-N,N-dimethylpicolinamide
                                grams per 1000 liters__ 40.0
Sugar _____do____ 500.0
Glycerin _____do____ 200.0
Compound orange spirit _____ml___ 10.0
Alcohol _____ml___ 100.0
Amaranth _____ml___ 0.1
Water, q.s. 1000.0 ml.

Dissolve the 5-n-butyl-N,N - dimethylpicolinamide, the sugar, the glycerin and the amaranth successively in approximately 400 ml. of water with the aid of heat. Cool the solution to room temperature. Dissolve the compound orange spirit in the alcohol and add the alcoholic solution to the elixir base. Add sufficient water to make the product measure 1000 ml. and agitate until homogeneous. Clarify the elixir by passing it through an asbestos pad, using a filter aid if necessary.

INJECTION FORMULATION

Formula:                                Grams per 1000 ampuls
5-n-butyl - N,N - dimethylpicolinamide _____ 110.0
Water for injection, q.s. 1100.0 ml.

Dissolve the 5-n-butyl-N,N - dimethylpicolinamide in the water for injection. Pass the solution through a sterile 0.45 micron membrane filter. Fill asceptically into ampuls (1.1 ml. per ampul). Autoclave the sealed ampuls for 30 minutes under 20 p.s.i.g. steam pressure.

In order to achieve a satisfactory anti-hypertensive response, usually no more than 1 to 3 tablets or capsules as described above need be administered daily. The elixir described is usually administered in the amount of 1 to 3 teaspoons (5 cc.) per day while the usual injection dosage is 1 to 3 cc. per day. In severe or aggravated conditions, additional medication may be administered.

The present invention resides in the concept of antihypertensive compositions wherein the essential active ingredient is 5-X-picolinamide or the N-methyl or N,N-dimethylamido derivatives thereof wherein X is a member selected from the group consisting of lower alkyl or lower alkoxy groups having from 1 to 5 carbon atoms. It is contemplated that dosage units of such compositions will be administered daily, either as tablets, capsules, elixirs, or the like, or by injection, in order to achieve an anti-hypertensive response.

The following X-substituted picolinic acids, and esters and amides thereof may be formulated into pharmaceutically acceptable compositions useful for lowering high blood pressure:

5-n-butylpicolinic acid;
5-t-butylpicolinic acid;
5-propylpicolinic acid;
5-cyclopropylpicolinic acid;
5-ethylpicolinic acid;
5-butenylpicolinic acid;
5-cyclopentenylpicolinic acid;
5-methoxypicolinic acid;
5-ethoxypicolinic acid;
5-propoxypicolinic acid;
5-hexylpicolinic acid;
5-cyclopentylpicolinic acid;
5-isopropoxypicolinic acid;
5-pentylpicolinic acid;
5-phenylpicolinic acid;
5-3,4-dimethoxyphenylpicolinic acid;
5-p-n-butylphenylpicolinic acid;
5-p-chlorphenylpicolinic acid;
5-cyclohexylpicolinic acid;
3-n-butylpicolinic acid;
3-t-butylpicolinic acid;
3-propylpicolinic acid;

3-cyclopropylpicolinic acid;
3-ethylpicolinic acid;
3-butenylpicolinic acid;
3-cyclopentenylpicolinic acid;
3-methoxypicolnic acid;
3-ethoxypicolinic acid;
3-propoxypicolinic acid;
3-hexylpicolinic acid;
3-cyclopentylpicolinic acid;
3-isopropoxypicolinic acid;
3-pentylpicolinic acid;
3-phenylpicolinic acid;
3-3,4-dimethoxyphenylpicolinic acid;
3-p-n-butylphenylpicolinic acid;
3-p-chlorphenylpicolinic acid;
3-cyclohexlpicolinic acid;
5-n-butyl-N,N-dimethylpicolinamide;
5-cyclopentyl dimethylpicolinamide;
5-cyclohexyl dimethylpicolinamide;
5-phenyl dimethylpicolinamide;
5-n-butyl picolinamide;

DOCA pellet is totally absorbed. This phase lasts some 6–10 weeks after implantation.

The second phase is a post-metacorticoid hypertension which is self-sustaining for as much as a year. This hypertension resembles human essential hypertension in several respects. Pathological changes observed in kidneys and heart are similar to those seen at post-mortem in untreated human essential hypertension. Furthermore, drugs which affect human hypertension also are similarly active in this rat model.

The hypertensive rat is minimally restrained in a plastic chamber and sphygmomanometer cuff is placed at the base of the tail. A sensitive condenser-microphone pickup is then taped to the tail. This device permits the electronic sensing and recording of the arterial pulse exactly as in classical sphygmomanometry.

The drugs were administered orally. Readings of systolic pressure were taken on an oscilloscope using an aneroid pressure sensor hourly after oral administration.

The hypotensive effect of a few of the compounds embraced by Formula I above are illustrated as follows:

| Compound name | Dose, mg./kg. | No. of rats | Pre-treatment average systolic pressure | Maximal post-treatment systolic pressure (mm. Hg) | Percent change |
|---|---|---|---|---|---|
| 5-n-butyl-N-methylpicolinamide | 30 | 5 | 215 | 173 | 1 −19 |
| Do | 100 | 5 | 193 | 145 | 1 −25 |
| 5-ethylpicolinamide | 30 | 10 | 179 | 162 | 1 −10 |
| Do | 100 | 5 | 174 | 110 | 1 −37 |
| 5-n-butylpicolinamide | 200 | 10 | 208 | 126 | 1 −40 |
| 5-n-butyl-N,N-dimethylpicolinamide | 25 | 5 | 189 | 180 | 1 −11 |
| Do | 50 | 10 | 204 | 170 | 1 −17 |
| Do | 200 | 10 | 190 | 126 | 1 −39 |

1 Statistically significant effect (paired t-test; p 0.05).

5-n-butyl-N,N-diethylpicolinamide;
5-cyclopentyl-N,N-diethylpicolinamide;
5-cyclohexyl-N,N-diethylpicolinamide;
5-phenyl-N,N-diethylpicolinamide;
5-n-butyl-N-methylpicolinamide;
5-(n-butyl)-picolinoylhydroxamic acid;
5-(cyclopentyl)-picolinoylhydroxamic acid;
ethyl-5-n-butylpicolinate;
5-n-butyl-N-ethylpicolinamide;
5-n-butyl-N-cyclopropylpicolinamide;
3-n-butyl-N,N-dimethylpicolinamide;
3-cyclopentyl dimethylpicolinamide;
3-cyclohexyl dimethylpicolinamide;
3-phenyl dimethylpicolinamide;
3-n-butyl-picolinamide;
3-n-butyl-N,N-diethylpicolinamide;
3-cyclopentyl-N,N-diethylpicolinamide;
3-cyclohexyl-N,N-diethylpicolinamide;
3-phenyl-N,N-diethylpicolinamide;
3-n-butyl-N-methylpicolinamide;
3-(n-butyl)-picolinoylhydroxamic acid;
3-(cyclopentyl)-picolinoylhydroxamic acid;
ethyl-3-n-butyl picolinate;
3-n-butyl-N-ethylpicolinamide and
3-n-butyl-N-cyclopropylpicolinamide.

As stated above, the method of lowering high blood pressure in warm blooded animals is effected by administering a therapeutically effective quantity of an X-substituted picolinic acid, ester or amide (as defined for Formula I above). The therapeutically effective quantity of a compound of Formula I may readily be ascertained by standard and well-known techniques in the art. One such laboratory technique is the Desoxycorticosterone Acetate Hypertension Test in the rat (DOCA-Hypertension-Rat) described as follows:

Rats will become hypertensive if a 25 mg. pellet of desoxycorticosterone acetate is subcutaneously implanted at the same time as 1 percent NaCl is substituted for normal drinking water. This hypertension passes through two phases. The first is that induced solely by the salt retaining effect of the mineralocorticoid and persists until the Accordingly, from the foregoing test procedures as well as by other standard laboratory techniques as well as by comparison with well-known hypotensive agents, the therapeutically effective dosage range for lowering high blood pressure in warm-blooded animals is readily determined. From these tests a therapeutically effective dosage range for the compounds of this invention is 15–250 mg./kg. of body weight. Although it is expected that a therapeutically effective dosage will be administered about three times daily, the actual total daily dosage will depend upon the degree of severity of the hypertension, its cause and other health factors of the hypertensive warm blooded animal. Thus, in each specific instance the attending diagnostician will determine the dosage frequency and degree of lowering the high blood pressure.

The use of anti-hypertensive agents to reduce elevated blood pressure has gained wide acceptance. The spectrum of drug types ranges from the very potent ganglionic blocking drugs to the mild diuretics of the benzothiadiazine type.

The development of some compounds currently used for anti-hypertensive therapy recognizes the role of the adrenergic nervous system, particularly epinephrine and norepinephrine, the latter being the predominant adrenergic neuromediator, in maintaining arterial pressure. Thus, α-adrenergic blocking compounds (phentolamine or dibenzyline), amine depleters (reserpine or syrosingopine), false transmitter-depleter (α-methyl dopa), and post-ganglionic adrenergic neurone blockers (guanethidine or bretylium) all decrease arterial pressure by modulating some component(s) of the adrenergic nervous system.

Although applicants do not necessarily desire to speculate upon the mechanism by which the compounds of Formula I of this invention exert these hypotensive effects, the anti-hypertensive therapy of these compounds could involve enzyme inhibition of neurotransmitter synthesis. Since norepinephrine is the sympathetic neurohumoral transmitter which plays a key role in the maintenance of blood pressure, inhibition of its synthesis should yield an effective anti-hypertensive agent. Suppression of norepinephrine synthesis from its immediate precursor, dopamine, can be achieved by an adequate inhibition of the enzyme, dopamine β-hydroxylase. In their action in warm blooded animals it is found that the compounds of this invention are inhibitors of dopamine β-hydroxylase.

Using standard laboratory techniques it has also been found that the toxic dosage levels ($LD_{50}$) of the compounds of this invention is significantly greater than the minimal effective dosage range necessary to achieve a hypotensive effect.

As is true for all classes of compounds useful in the treatment of physiological disorders, not all the members are equipotent. From the above-described laboratory techniques it is determined that, in general, those picolinic acids, esters and amides of Formula I having an X-substituent located at either the 5-position or the 3-position exhibit a more potent hypotensive effect than at the 4-position, with the 5-position being preferred. Although the X-substituted picolinic acids are, in general, about equipotent as the amides, the overall pharmacological effect of the amides indicates a more favorable therapeutic profile. The preferred X-substituent is lower alkyl, with the n-butyl substituent being the most preferred. Specific compounds of this invention which are of particular interest for their anti-hypertensive effect in warm-blooded animals are: 5-n-butylpicolinamide; 5-n-butylpicolinic acid; 5-n-butyl-N,N-dimethylpicolinamide; 5-cyclopentylpicolinic acid; 5-cyclopentylpicolinamide; 5-cyclohexylpicolinic acid; 5-phenylpicolinic acid; 3-n-butylpicolinamide; 3-n-butylpicolinic acid and 3-n-butyl-N,N-dimethylpicolinamide.

The compounds of this invention, as defined by Formula I, may also be combined with known diuretics, particularly the thiazide diuretics, and with known hypotensive agents so as to achieve enhanced hypotensive effects.

We claim:
1. A method of lowering high blood pressure, said method comprising administering to a warm-blooded animal having high blood pressure, a therapeutically effective quantity of a compound of the formula

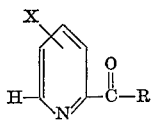

wherein X represents a member of the group consisting of lower alkyl, lower alkenyl of 3 to 6 carbon atoms, lower alkoxy, phenyl and $X_1$ substituted phenyl wherein $X_1$ is a member of the group consisting of lower alkoxy, chlorine, bromine, trifluoromethyl and hydroxy, R represents a member of the group consisting of —OH, —O-lower alkyl, and —$NR_1R_2$ wherein $R_1$ is a member of the group consisting of hydrogen, methyl and ethyl, and $R_2$ is a member of the group consisting of hydrogen, methyl, ethyl and, when $R_1$ is hydrogen, $R_2$ is also hydroxy and cyclopropyl.

2. A method of claim 1, wherein the compound has the formula:

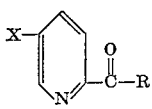

wherein X represents a member of the group consisting of lower alkyl, lower alkenyl of 3 to 6 carbon atoms, lower alkoxy, phenyl and $X_1$ substituted phenyl wherein $X_1$ is a member of the group consisting of lower alkoxy, chlorine, bromine, trifluoromethyl and hydroxy, R represents a member of the group consisting of —OH, —O-lower alkyl, and —$NR_1R_2$ wherein $R_1$ is a member of the group consisting of hydrogen, methyl and ethyl, and $R_2$ is a member of the group consisting of hydrogen, methyl, ethyl and, when $R_1$ is hydrogen, $R_2$ is also hydroxy and cyclopropyl.

3. A method of claim 1, wherein the compound has the formula:

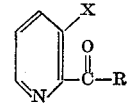

wherein X represents a member of the group consisting of lower alkyl, lower alkenyl of 3 to 6 carbon atoms, lower alkoxy, phenyl and $X_1$ substituted phenyl wherein $X_1$ is a member of the group consisting of lower alkoxy, chlorine, bromine, trifluoromethyl and hydroxy, R represents a member of the group consisting of —OH, —O-lower alkyl, and —$NR_1R_2$ wherein $R_1$ is a member of the group consisting of hydrogen, methyl and ethyl, and $R_2$ is a member of the group consisting of hydrogen, methyl, ethyl and, when $R_1$ is hydrogen, $R_2$ is also hydroxy and cyclopropyl.

4. A method of claim 1, wherein the compound has the formula:

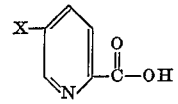

wherein X represents a member of the group consisting of lower alkyl, lower alkenyl of 3 to 6 carbon atoms, lower alkoxy, phenyl and $X_1$ substituted phenyl wherein $X_1$ is a member of the group consisting of lower alkoxy, chlorine, bromine, trifluoromethyl and hydroxy.

5. A method of claim 1, wherein the compound has the formula:

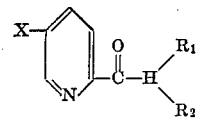

wherein X represents a member of the group consisting of lower alkyl, lower alkenyl of 3 to 6 carbon atoms, lower alkoxy, phenyl and $X_1$ substituted phenyl wherein $X_1$ is a member of the group consisting of lower alkoxy, chlorine, bromine, trifluoromethyl and hydroxy, $R_1$ is a member of the group consisting of hydrogen, methyl and ethyl, and $R_2$ is a member of the group consisting of hydrogen, methyl, ethyl and, when $R_1$ is hydrogen, $R_2$ is also hydroxy and cyclopropyl.

6. A method of claim 1, wherein the compound has the formula:

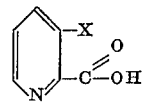

wherein X represents a member of the group consisting of lower alkyl, lower alkenyl of 3 to 6 carbon atoms, lower alkoxy, phenyl and $X_1$ substituted phenyl wherein $X_1$ is a member of the group consisting of lower alkoxy, chlorine, bromine, trifluoromethyl and hydroxy.

7. A method of claim 1, wherein the compound has the formula:

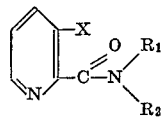

wherein X represents a member of the group consisting of lower alkyl, lower alkenyl of 3 to 6 carbon atoms, lower alkoxy, phenyl and $X_1$ substituted phenyl wherein $X_1$ is a member of the group consisting of lower alkoxy, chlorine, bromine, trifluoromethyl and hydroxy, $R_1$ is a member of the group consisting of hydrogen, methyl and ethyl, and $R_2$ is a member of the group consisting of hydrogen, methyl, ethyl and, when $R_1$ is hydrogen, $R_2$ is also hydroxy and cyclopropyl.

8. A method of claim 1, wherein the compound has the formula:

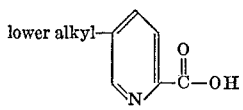

9. A method of claim 1, wherein the compound has the formula:

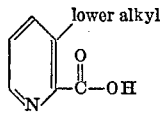

10. A method of claim 1, wherein the compound has the formula:

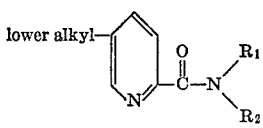

wherein $R_1$ is a member of the group consisting of hydrogen, methyl and ethyl, and $R_2$ is a member of the group consisting of hydrogen, methyl, ethyl and, when $R_1$ is hydrogen, $R_2$ is also hydroxy and cyclopropyl.

11. A mehod of claim 1, wherein the compound has the formula:

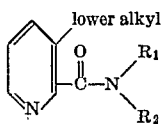

wherein $R_1$ is a member of the group consisting of hydrogen, methyl and ethyl, and $R_2$ is a member of the group consisting of hydrogen, methyl, ethyl and, when $R_1$ is hydrogen, $R_2$ is also hydroxy and cyclopropyl.

12. A method of claim 1, wherein said compound is 5-n-butylpicolinamide.

13. A method of claim 1, wherein said compound is 5-n-butylpicolinic acid.

14. A method of claim 1, wherein said compound is 5-n-butyl-N,N-dimethylpicolinamide.

References Cited

UNITED STATES PATENTS

| | | | |
|---|---|---|---|
| 3,197,473 | 7/1965 | Klosa | 260—287 |
| 3,272,834 | 9/1966 | Kraushaar et al. | 260—295.5 |

OTHER REFERENCES

Allen et al.: Proceedings of the Staff Meetings of the Mayo Clinic, vol. 29, No. 17, pp. 459–460 (1954).

Libermann et al.: Comptes Rendus Hebdomadaires des Seances de l'Academie des Sciences, vol. 242, pp.2409–2412 (1956).

Derwent: Farmdoc #12870, Abstracting French Patent #928,504, June 15, 1964.

ALBERT T. MEYERS, Primary Examiner

A. J. ROBINSON, Assistant Examiner

U.S. Cl. X.R.
260—295